Nov. 19, 1957  G. R. BOYER ET AL  2,813,676
SELF-COMPLEMENTING ELECTRONIC COUNTER
Filed Jan. 27, 1954  4 Sheets-Sheet 1

INVENTORS
G. R. BOYER
E. ESTREMS
BY
AGENT

INVENTORS
G.R. BOYER
E. ESTREMS

INVENTORS
G. R. BOYER
E. ESTREMS

United States Patent Office 2,813,676
Patented Nov. 19, 1957

2,813,676

SELF-COMPLEMENTING ELECTRONIC COUNTER

Gérard R. Boyer, Montrouge, and Eugenio Estrems, Saint-Mande, France, assignors to International Business Machines Corporation, New York, N. Y., a corporation of New York Application January 27, 1954, Serial No. 406,490

Claims priority, application France April 16, 1953

7 Claims. (Cl. 235—92)

The present invention relates to an improvement to electronic counters and more especially to electronic counters employing trigger circuits.

It has become current to group an assembly of electronic trigger circuits in order to represent a given number in a system having a determined base.

Among these assemblies, particular attention has been given to creating, for some of them, means of linking together certain trigger circuits in such manner that the sum of the amounts represented by each of the trigger circuits affected by a given recording operation, is equal to either the complement to a base number minus one, or to the sum of the amounts corresponding to the trigger circuits unaffected by that recording operation.

Such systems have the advantage of enabling, by simply inverting the stable state of each trigger circuit forming the counter, such as to obtain the complement of the number registered therein.

This conversion of the recorded number into its complement is mainly used for performing subtraction calculations without having to employ auxiliary counter registration circuits. If a number A has been registered in a given counter, it is sufficient to cause inversion of all the trigger circuits to obtain the complement of the number.

A device of this class is disclosed in an application by L. R. Harper, Serial No. 202,119, filed December 21, 1950.

The main object of the present invention consists of a novel mode of conversion of the amount registered in a counter, by means of a single tube which controls the change of condition of all the trigger circuits whatever the orders to which they are assigned.

Another object of the present invention consists of the novel combination of an electronic counter coupled to a single device comprising a thyratron which is capable, following a single control impulse, of emitting a short high-powered impulse designed to cause a complemental conversion of the data registered in the various counter orders.

Another object of the present invention consists of the provision of circuits capable of ensuring the assembly formed by an electronic counter and the single aforementioned device, a high degree of operational safety; this is obtained by means for emitting two short impulses for enabling the reversal of the stable states of the trigger circuits in a counter in a determined order.

Another object of the present invention consists in providing a single circuit capable of blocking all the carry circuits during the conversion of the amounts registered in a counter, these circuits being controlled by the afore-mentioned single device.

Other objects of the invention will be pointed out in the following description and claims and illustrated in the accompanying drawings, which disclose, by way of example, the principle of the invention and the best mode, which has been contemplated, of applying that principle.

Figure 1:
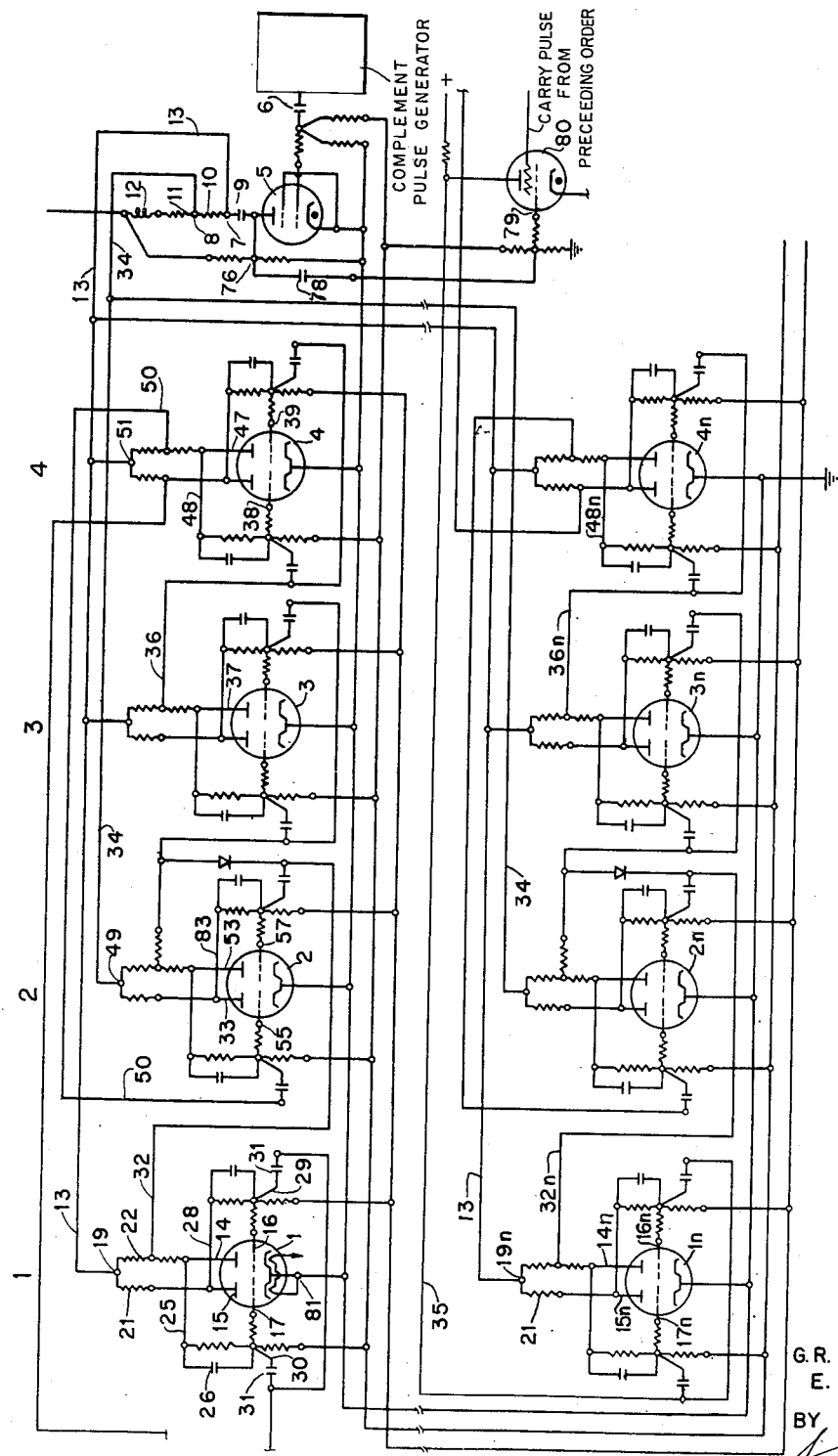
Fig. 1 shows generally, the subject matter of the invention.

To avoid complicating the drawing, only the units order and the last order of an accumulator is shown in Fig. 1.

The operation of such a counter is described in detail in the afore-mentioned patent application filed by Harper, and only the coding values assigned to each trigger circuit and in each order to register a certain amount will be given here.

Each decimal order adapted to register a given digit is formed by four trigger circuits shown in 1, 2, 3 and 4 on the drawing of Fig. 1. Each trigger circuit is constituted by two triodes adapted to represent at a single time either of two stable conditions: one when the right-hand triode is made conductive (normal condition), the other when the left-hand triode is made conductive (changed-over condition). The normal condition represents value "0" in all the trigger circuits. The changed-over condition represents value "1" for trigger circuit 1, value "2" for trigger circuits 2 and 3, and value "4" for trigger circuit 4.

The digit "3" is represented in an accumulator of this type by changing over the condition of trigger circuits 1 and 2, and it can be seen that the nines complement of a value is obtained by inverting the condition of each of the trigger circuits, viz. by simply making conductive the left-hand tubes of trigger circuits 3 and 4 which, by definition, represent "6," complement to "9" of the previously registered true number digit.

A careful study shows that the registration of digits 0 to 9 by means of these 4 trigger circuits corresponds to the following chart where "0" shows those trigger circuits which are unaffected by a registration operation and "X" those trigger circuits which are representative of a given value:

|    | Trigger Circuit 1 | Trigger Circuit 2 | Trigger Circuit 3 | Trigger Circuit 4 |
|----|----|----|----|----|
| 0  | 0 | 0 | 0 | 0 |
| 1  | X | 0 | 0 | 0 |
| 2  | 0 | X | 0 | 0 |
| 3  | X | X | 0 | 0 |
| 4  | 0 | 0 | X | 0 |
| 5  | X | 0 | X | 0 |
| 6  | 0 | X | 0 | X |
| 7  | X | X | 0 | X |
| 8  | 0 | 0 | X | X |
| 9  | X | 0 | X | X |
| 10 | 0 | 0 | 0 | 0 |

It may be assumed now that, with a certain number registered in the counter, it is desired to control the conversion of that number, which is represented there by trigger circuits with their left-hand triode made conductive, into the nines complement thereof.

To this effect, the conversion control device receives, through capacitor 6, a positive impulse which is transmitted to the control grid of thyratron 5.

Figure 4:
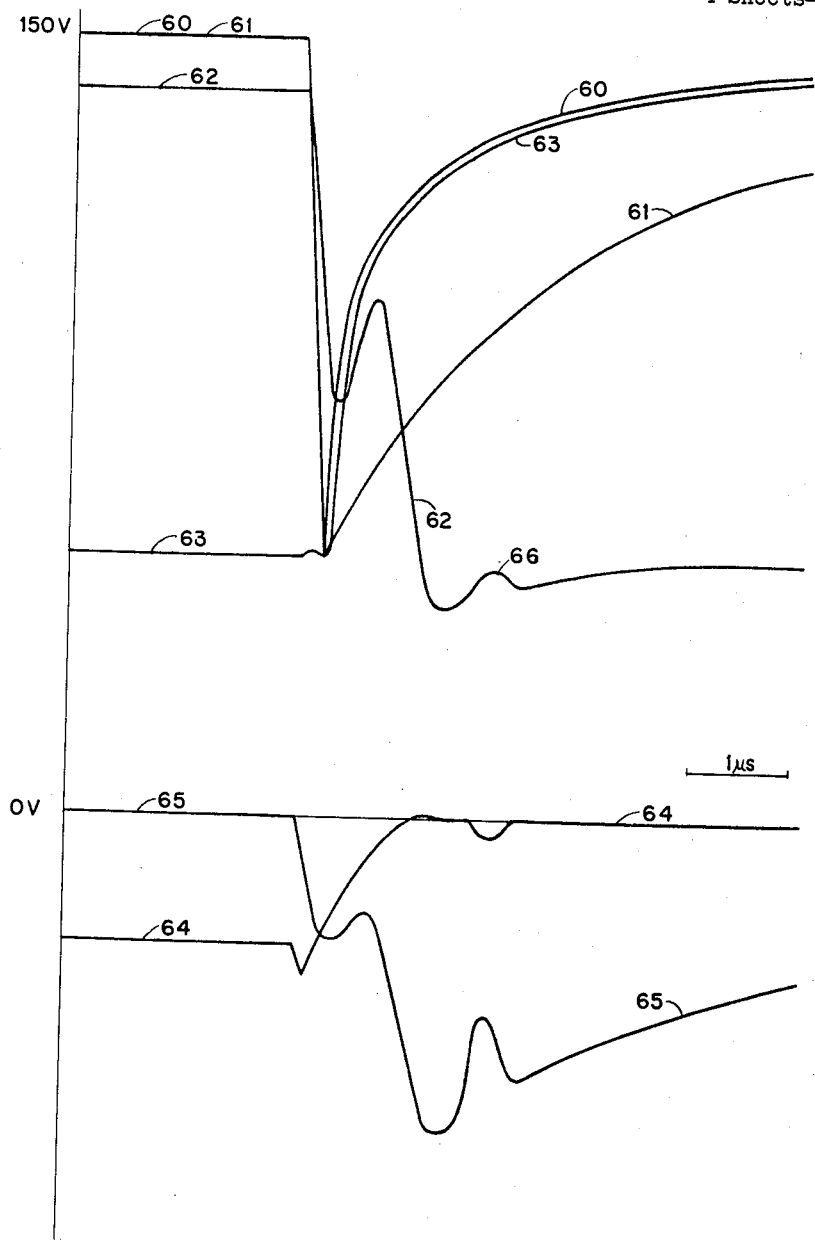
Fig. 4 shows the variations of the grid and plate voltages on the trigger circuits of rank 2 following the control impulses directed through the circuits object of invention.

When the tube 5 fires, a sudden voltage drop is collected at points 7 and 8, these variations being represented respectively by curves 61 and 60 on Fig. 4.

The short impulses thus formed are due to the reaction of the anode circuits of tube 5 which becomes non-conductive immediately after having been fired. The anode circuits include a capacitor 9 of approximately .25 mmfd., 10-ohm resistor 10, 5-ohm resistor 11 and inductance 12 of approximately 50 microhenries.

One of the impulses generated at point 7 is transmitted through wire 13 to all the anodes having a rank of 1, 3 and 4 of each counter position.

Under this condition, if it is assumed for example, that the right-hand triode of trigger circuit 1 is conductive and that the left-hand triode of trigger circuit 1n is also conductive, viz. if it is assumed that tubes 1 and 1n respectively represent values "0" and "1," the negative impulse sent through wire 13 causes the immediate inversion of these two trigger circuits, as shown by studying the circuits now to be described.

Figure 2:
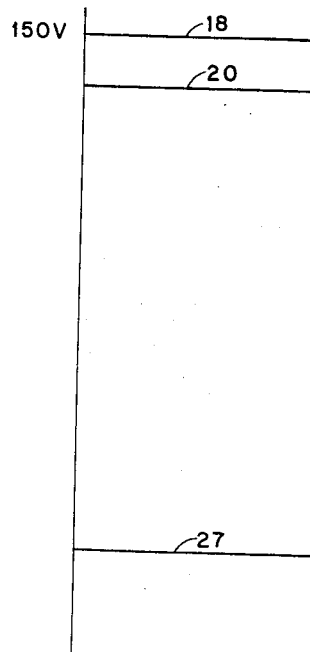
Fig. 2 shows the variations of the grid and plate voltages in the trigger circuits of rank 1, 3 and 4 of each counter position.
Figure 2:
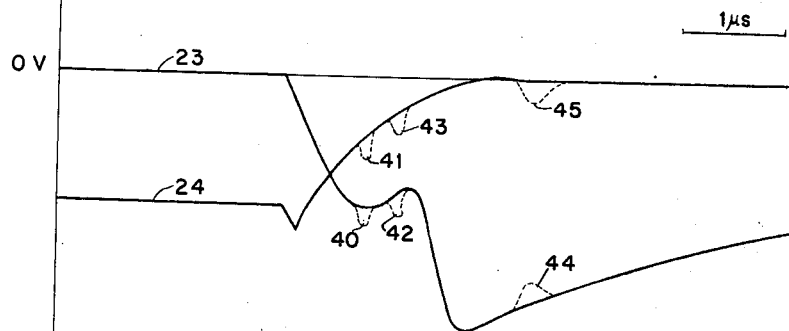

In order to follow in more detail the manner in which this conversion of the trigger circuits occurs, reference should be made to Fig. 2 where the voltages of anodes 14 and 15 as well as the corresponding voltages on grids 16 and 17 are shown in ordinates.

The voltage variation sent through wire 13 is shown on that figure by curve 18. The rapid drop in the voltage applied to posts 19 and 19n causes a voltage drop on anode 15 which is shown by curve 20, while the voltage remains practically unchanged on anode 14 during the first phase, since it has been assumed that tube 1 was already conductive and consequently that anode 14 was already at about 50 volts potential.

The reverse effects occur for anodes 14n and 15n of trigger circuit 1n. While no voltage variation occurs on anode 15n (the left-hand triode being conductive), the voltage on anode 14n drops rapidly as shown by curve 20.

A slight delay in the voltage drop on anode 15 in relation to signal 18 may be noticed. This delay and the smaller amplitude which is noted are due to the parasitic capacity effects resulting from the tubes and resistors such as 21.

During this first period, the voltage on grids 16 and 17 varies as shown respectively by curves 23 and 24. As grid 16, connected to anode 15, rapidly becomes negative, it cuts off conduction in the right-hand triode so that a positive impulse is directed through connection 25 to grid 17. The resulting voltage variation on anode 14 is shown in Fig. 2 by curve 27.

The positive impulse from connection 25 thus helps in reducing the effect of the negative impulse sent through wire 13, resistor 22 and capacitor 26. It should, however, be noted that the negative impulse sent through connections 28, 29 and 30 only has a slight effect on the voltage on grid 17, the size of both capacitors 31 wired in series being low in comparison with that of capacitor 26.

In the example chosen, the size of capacitors 26 has been selected at 100 mmfd., and that of each capacitor 31 at 40 mmfd. It may be ioted that in addition to the voltage increase on grid 17, the voltage on anode 15 always starts to rise with a very slight delay in relation to the voltage variation on wire 13 which starts to return to its initial value.

During this phase, the voltage on grid 16 starts rising slightly, although insufficiently to allow conduction to take place in the corresponding triode. On the other hand, although the voltage on anode 15 is very near to that of anode 14, the left-hand triode becomes conductive owing to the positive voltage level reached on grid 17.

In these conditions, a negative impulse is again directed to grid 16, thus definitely blocking conduction in this right-hand triode.

Value "0" represented by trigger circuit 1 has thus been converted into value "1." It will also appear that trigger circuit 1n, which initially contained value "1" now represents value "0." To this effect, reference should be made to Fig. 2 where curves 20, 27, 24 and 23, respectively, represent the voltage variations on anodes 14n, 15n and on grids 16n and 17n.

It should also be noted that the impulse transmitted by connection 32, resulting from the voltage variation on anode 33 of trigger circuit 2, through wire 83, has no practical effect on trigger circuit 1 whatever the conductivity condition of the right-hand or left-hand triodes.

Similarly, trigger circuit 1n, which is connected to the neighboring trigger circuit through connection 32n is unaffected by the impulses sent through it, which are of insufficient amplitude. It may be noted that, by means of the circuits provided in this device, all carries from order to order are automatically blocked during a conversion cycle. Under these conditions, no impulse is transmitted over wire 35 so that trigger circuit 1n is inverted by the same conditions obtaining in trigger circuit 1.

The elimination of carries is realized by using the impulse produced by the firing of tube 5 collected at point 76, in Fig. 1, which is shown by curve 77, in Fig. 2. The very small amount of slope in the right-hand part of the curve shows that it is of sufficient amplitude duration to apply a negative voltage on grid 79 of the carry tube 80 to hold the latter blocked during the whole conversion operation. To this effect, the impulse generated at point 76 is additionally directed through capacitor 78 to grid 79 of carry control tube 80 for maintaining the grid of this tube below cutoff. Thus no impulses will occur on wire 35, due to a carry from a preceding order when the carry occurs as a result of a complement conversion cycle.

Inversion of trigger circuits 4 to 4n is performed in a manner identical to that just explained. However, to the effects previously described there is added the effect of an impulse originating with trigger circuit 3 through connection 36 when the right-hand triode of the latter happens to be conductive.

It is assumed, for example, that the left-hand triodes of trigger circuits 3 and 4 are conductive at the moment of conversion occurs and that, under effect of the negative conversion impulse occurring on impulse directed by wire 13, trigger circuit 3 happens to be inverted before trigger circuit 4, the voltage on anode 37 will drop abruptly.

This voltage drop is applied through wire 36 to grids 38 and 39 of trigger circuit 4 so that two minimum values may be noted, shown in 40 and 41 on curves 23 and 24 of Fig. 2.

The curves obtained in the case of inversion of trigger circuit 4 do not appreciably differ from those obtained in the case of trigger circuit 1. Curve 23 corresponds here to the voltage on grid 38 if it is assumed that the left-hand tube is conductive at the time of the conversion control; curve 24 shows the voltage on grid 39.

The voltage drop noted on anode 37 at the time when the right-hand triode of trigger circuit 3 becomes conductive is fairly small, the noted voltage drops 40 and 41, are also very small. It follows that operation of trigger circuit 4 is practically unaffected. The same happens if, due to circuit parameter variations, inversion of trigger circuit 3 occurs a little later than in the preceding example, i. e. in particular at the precise moment when trigger circuit 4 should get inverted. In these conditions, two minimum values 42 and 43 are again noted which operate to delay the conversion of trigger circuit 4.

Lastly, the inversion of trigger circuit 3 again has no effect on trigger circuit 4 if the latter inverts first. In that case, voltage variations may then be noted, these variations being shown in 44, 45 and 46 and due to the following effect: the negative impulse from the inversion of trigger circuit 3 the right-hand tube of which becomes conductive is directed to grids 38 and 39 from connection 36. This relatively weak impulse causes, by the voltage decrease on grid 39, a voltage rise an anode 47, shown by maximum value 46 of curve 20. It follows that connection 48 directs a positive impulse to grid 38 which, combined with the negative impulse coming directly from trigger circuit 3, only has a very slight effect on curve 23. This voltage rise is therefore insufficient to make conductive the left-hand tube of trigger circuit 4. Hence, whichever trigger circuit is inverted first, connection 36 has practically no influence on the conversion.

The effects just described are identical for all the trigger circuits of rank 3 and 4.

Operation of trigger circuit 2 is, however, slightly different from that just described. It is, however, possible, by appropriately selecting the resistor and capacitor values in each trigger circuit, to obtain an inversion of all the trigger circuits by a strictly identical process.

For standardization reasons, it is, however, better to control inversion of trigger circuits 2 in a manner different to that used for trigger circuits 3 and 4.

A description will be given first of a mode of operation where inversion of all the trigger circuits is controlled by one impulse. To this effect, it will be assumed that post 49 is connected to wire 13, instead of what is shown in Fig. 1. Under these conditions, trigger circuit 2 has a tendency to be inverted in the same manner as described for trigger circuits 1, 3 and 4. However, connections 32 and 50 may, in certain particular conditions, act to alter also the condition of trigger circuit 2.

It is clear that the condition of trigger circuit 2 may be affected by the condition of the other trigger circuits if connections 32 and 50 direct impulses which intended to prevent tube 2 from changing over condition at the time of conversion. For this to be realized, it is sufficient, if it may be assumed for example, that the right-hand triode of trigger circuit 2 is conductive, that the right-hand triode of trigger circuit 1 also is conductive, while the right-hand triode of tube 4 is non-conductive before the conversion.

Under these conditions, the impulse received on posts 19, 49 and 51 causes during the voltage drop from 150 to 50 volts transmitted through wire 13, a changeover in the stable states of the triggers as explained previously.

Figure 3:
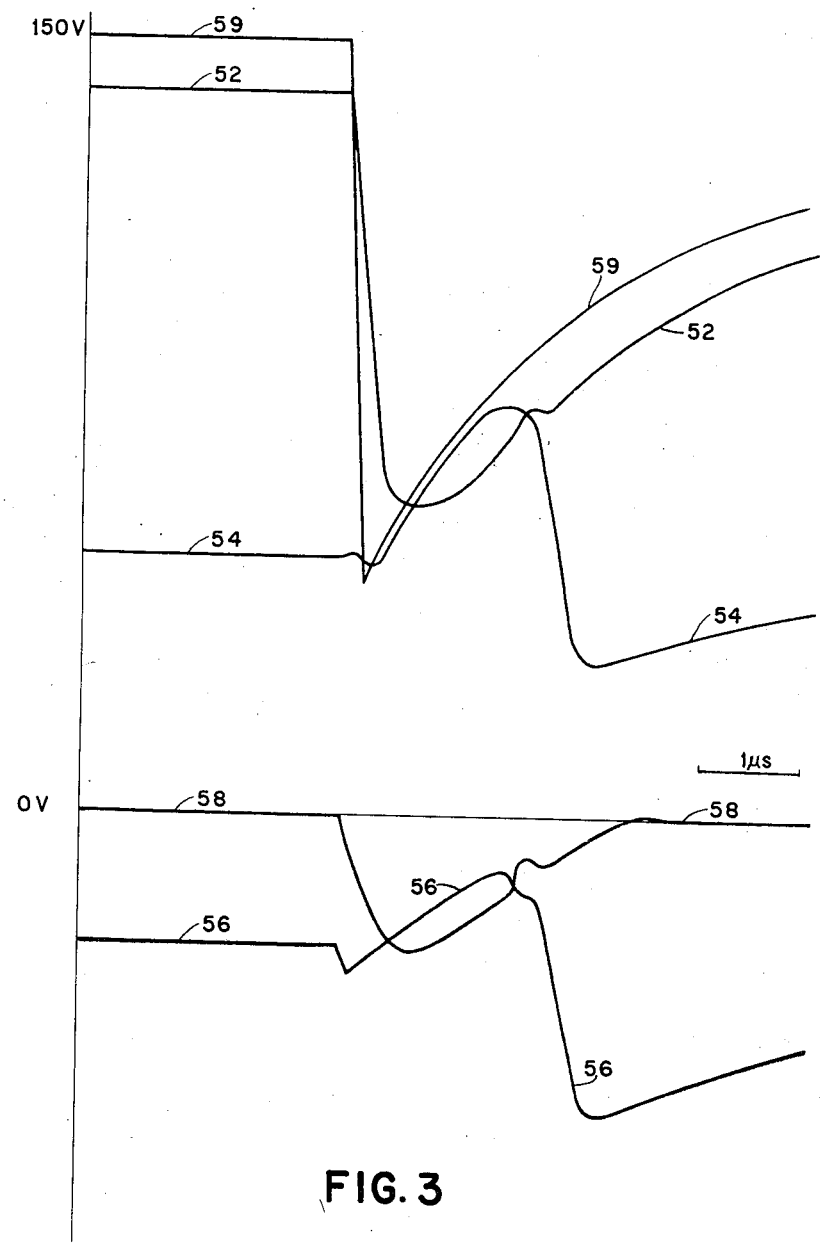
Fig. 3 shows the variations of the grid and plate voltages in the trigger circuits of rank 2 in one particular operational case.

Fig. 3 shows the voltage variations on anode 33 by means of curve 52; that of anode 53 by curve 54; that of grid 55 by curve 56; that of grid 57 by curve 58.

The voltage variation transmitted by wire 13 is shown by curve 59. It may be noted that these curves have the same general appearance as those of Fig. 2. In particular, it may be noted that, as before, the voltage on grid 57 drops and causes the blocking of the right-hand triode of trigger circuit 2.

Consequently, the voltage on grid 55 starts to rise while the voltage on grid 57 is still dropping. If the characteristics of the circuits controlling these tubes are such that curves 56 and 58 are sufficiently close to each other, it is possible, when trigger circuits 1 and 4 are simultaneously inverted, that the negative impulse, directed through connection 50, reduces the voltage of grid 55, while the positive impulse arising from the voltage increase on anode 14 of tube 1 and transmitted by connection 32, increases the voltage on grid 57. If this positive impulse is received at the time where the voltage on grid 56 is already sufficiently high, viz. at a time where normally the voltage on grid 55 could have made the left-hand triode conductive without action of the negative impulse from trigger circuit 4, the right-hand triode again becomes conductive thus returning trigger circuit 2 back to its initial stable state. This particular condition could be avoided by causing the inversion of trigger circuits 1 and 4 when the voltage on grid 57 is still sufficiently low. However, through the conversion system which has been adopted, it is very easy to avoid these particular conditions without having to modify on the values of the resistors and capacitors used for each trigger circuit.

To this effect, it is sufficient to connect post 49 to post 8 by means of wire 34. At post 8 where resistors 10 and 11 are joined, an impulse is generated which has a shorter time duration than that generated at post 7. Curve 60, Fig. 4, graphically shows the impulse appearing upon wire 34, and curve 61 similarly graphically depicts the impulse appearing upon wire 13. Curves 62, 63, 64 and 65, respectively, show the voltage variations on anodes 33 and 53 and on corresponding grids 55 and 57.

The curves thus obtained have the same appearance as those initially obtained, but are of a shorter time duration.

The speed at which the conversion of trigger circuit 2 is performed thus avoids the risk of making the same triode re-conductive during a single inversion. It follows that when trigger circuits 1 and 4 are inverted, the negative impulse directed through connection 50 causes a voltage drop on grid 55 which, in turn, causes a voltage rise on corresponding anode 33, shown by maximum value 66 of curve 62.

Similarly, grid 57 is much too negative to be affected by the voltage rise produced on the one hand by anode 33 and on the other by connection 32 which directs a positive impulse when the right-hand triode of trigger circuit 1 becomes non-conductive.

It will be apparent that all the trigger circuits could have been controlled for inversion by applying, instead of a negative impulse on the cathodes, a positive impulse to all the cathodes.

Figure 5:
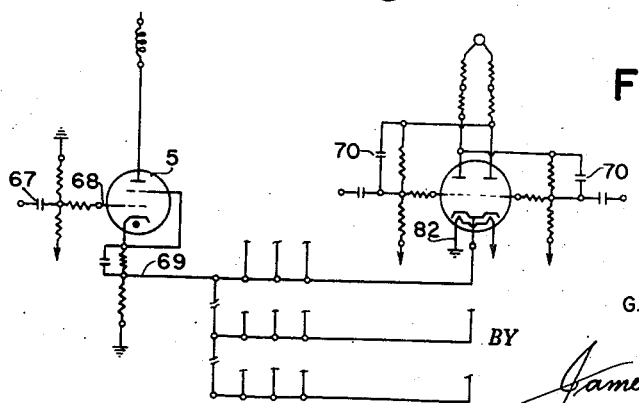
Fig. 5 shows another embodiment of the circuit of Fig. 1.

To this effect, thyratron 5 could be mounted according to the diagram shown in Fig. 5.

When the positive impulse is applied to grid 68 through capacitor 67, thyratron 5 fires and then rapidly ceases being conductive. There follows a positive impulse collected at post 69, which is transmitted to all the cathodes and changes the stable state condition of each trigger circuit. This change of condition is preformed, as already stated in the afore-mentioned patent application, Serial No. 202,119, filed on December 21, 1950, by means of the positive impulses directed through capacitors such as 70, resulting from the anode voltage increase due to blocking of the conductive triodes.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the invention, therefore, to be limited only as indicated by the scope of the following claims.

What is claimed is:

1. An electronic counter comprising a plurality of cascade coupled triggers, each trigger comprising a pair of cross-coupled triodes adapted to be operated to either of two stable states, a diode, means under control of a trigger for rendering said diode operable to alter the normal sequence operation of said cascade of triggers, a gas tube adapted to generate a primary conversion pulse for simultaneous application to the anode circuits of all but one of said triggers, and means for generating a second pulse from said primary pulse for subsequent application to the anode circuit of the previously excepted trigger.

2. A device for self-complementing an electronic counter of the type employing a cascade of triggers, comprising, in combination, a gaseous discharge tube, a delay line connected in the anode circuit thereof, a source of pulses for rendering said gaseous tube conductive for generating a pulse in said delay line for delaying the same, a cascade of dual stability triggers, means for reversing the status of all but one trigger of the cascade of triggers, in response to the initiation of conduction of current through said gaseous tube and means responsive to said delayed pulse for reversing the status of said one trigger.

3. A device of the character described for self-complementing an electronic counter of the type employing a cascade of dual stability triggers, comprising, in combination, a gaseous discharge tube having at least an anode, a cathode and control grid means for initiating a discharge therethrough, a network connected to said anode and responsive to discharges through said tube, a pair of network output terminals, complementing pulse source means cooperating with said control grid and adapted to initiate a discharge through said tube for generating a pulse wave in said network, a cascade of dual stability triggers, means connecting one of said output terminals to certain of said triggers, means connecting other triggers to the other of said output terminals.

4. A self-complementing electronic counter comprising a plurality of cascade coupled triggers, each trigger comprising a pair of cross coupled triodes adapted to be operated to either of two stable states, electronic means for generating an impulse, network means responsive thereto for generating a second impulse, means responsive to said impulse for operating certain triggers of said cascade of triggers to their other stable state and means responsive to said second impulse for operating the other triggers of said cascade to their other stable state for manifesting the complement of a true number.

5. A self-complementing electronic counter comprising, in combination, a plurality of cascade coupled triggers, each trigger further comprising a pair of cross coupled electron discharge tubes adapted to operate to either of two stable states, means for firstly manifesting a true value number according to a given notation in said counter, means for generating a pair of impulses operable to cause said counter to manifest the complement to a determined base of said true value number comprising a gaseous discharge tube adapted to generate a primary conversion pulse, a wave transmission network responsive to the primary conversion pulse to generate a secondary conversion pulse, means operable to reverse certain of said cascade of triggers from one stable state to the other in response to the generation of the primary conversion pulse, and means operable to cause reversal of the others of said cascade of triggers in response to the generation of the secondary conversion pulse for manifesting in said counter the complement of the first manifested number.

6. A plural order self-complementing electronic accumulator comprising, in combination, a plurality of chains of cascade coupled triggers, each trigger comprising a pair of cross-coupled electronic devices, a unilateral current conducting device cooperating with each chain, means under control of a trigger in each chain for rendering the associated unilateral current conducting device operable to alter the normal sequence of operation of said chain, means for initially manifesting a representation the digits of a true multi-digit number, means for effecting carries from one order to another, means including a gaseous discharge tube associated with a wave transmission network of the type which is not terminated in its characteristic impedance for generating a pair of sequentially occurring complement conversion pulses, means responsive to one of said pair of conversion pulses for altering the stable status of all but one of said triggers in each chain of triggers, means responsive to the other of said pair of conversion pulses for altering the stable status remaining trigger in each chain of triggers, and means responsive to the alteration of the stable status of any of the triggers comprising said accumulator and the first of said pair of conversion pulses for disabling the carry effecting means during a conversion operation for manifesting a representation of the complement of said multi-digit number.

7. A plural order self-complementing electronic accumulator comprising, in combination, a plurality of chains of cascade coupled triggers, each trigger comprising a pair of cross-coupled electronic devices, a unilateral current conducting device cooperating with each chain, means under control of a trigger in each chain for rendering the associated unilateral current conducting device operable to alter the normal sequence of operation of said chain, means for initially manifesting a representation the digits of a true multi-digit number, means for effecting carries from one order to another, electron means for generating a first conversion impulse, network means cooperating with said electron means for generating a second conversion impulse, means responsive to the first conversion pulses for altering the stable status of all but one of said triggers in each chain of triggers, means responsive to the second conversion pulses for altering the stable status remaining trigger in each chain of triggers, and means responsive to the alteration of the stable status of any of the triggers comprising said accumulator and the first conversion pulses for disabling the carry effecting means during a conversion operation for manifesting a representation of the complement of said multi-digit number.

References Cited in the file of this patent

UNITED STATES PATENTS 2,540,442    Grosdoff _____ Feb. 6, 1951

FOREIGN PATENTS 674,326    Great Britain _____ June 25, 1952